United States Patent
Pasero et al.

(10) Patent No.: US 8,543,317 B2
(45) Date of Patent: Sep. 24, 2013

(54) METHOD FOR MANAGING THE RELATIVE HUMIDITY IN THE AIR PATH OF AN INTERNAL COMBUSTION ENGINE EQUIPPED WITH A LOW PRESSURE EGR SYSTEM

(75) Inventors: Paolo Pasero, Turin (IT); Alberto Vassallo, Turin (IT); Federico Luigi Guglielmone, Rivoli (IT)

(73) Assignee: GM Global Technology Operations LLC, Detroit, MI (US)

(*) Notice: Subject to any disclaimer, the term of this patent is extended or adjusted under 35 U.S.C. 154(b) by 266 days.

(21) Appl. No.: 13/091,888

(22) Filed: Apr. 21, 2011

(65) Prior Publication Data

US 2012/0024271 A1    Feb. 2, 2012

(30) Foreign Application Priority Data

Apr. 21, 2010  (GB) .................................. 1006690.0

(51) Int. Cl.
*G06F 7/70* (2006.01)
*F02M 25/07* (2006.01)

(52) U.S. Cl.
USPC ..................... 701/108; 123/568.22; 60/605.2

(58) Field of Classification Search
USPC ............... 701/108, 109; 123/568.21, 568.22, 123/677–679, 703; 60/274, 276, 285, 605.2; 702/50, 182; 73/23.32, 114.31, 114.71, 114.74
See application file for complete search history.

(56) References Cited

U.S. PATENT DOCUMENTS

| | | | |
|---|---|---|---|
| 4,168,683 A | 9/1979 | Hata et al. | |
| 5,597,951 A * | 1/1997 | Yoshizaki et al. | ......... 73/114.32 |
| 6,575,148 B1 | 6/2003 | Bhargava et al. | |
| 6,681,171 B2 | 1/2004 | Rimnac et al. | |
| 6,817,197 B1 | 11/2004 | Padfield | |
| 6,886,336 B2 | 5/2005 | Super et al. | |
| 6,934,621 B2 * | 8/2005 | Bhargava et al. | ............. 701/108 |

(Continued)

FOREIGN PATENT DOCUMENTS

| | | |
|---|---|---|
| DE | 2752877 A1 | 6/1978 |
| DE | 19924920 A1 | 12/2000 |

(Continued)

OTHER PUBLICATIONS

British Patent Office, British Search Report for British Application No. 1006690.0, dated Jul. 19, 2010.

*Primary Examiner* — Willis R Wolfe, Jr.
*Assistant Examiner* — Johnny Hoang
(74) *Attorney, Agent, or Firm* — Ingrassia Fisher & Lorenz, P.C.

(57) ABSTRACT

A method is provided for estimating the relative humidity in an intake line of an internal combustion engine provided with an intake manifold connected to the intake line, an exhaust line, and a Low Pressure EGR (LPE) conduit which fluidly connects the exhaust line to a connecting point of said intake line. The method includes, but is not limited to calculating specific humidity in the exhaust line, as a function of the $O_2$ concentration in said exhaust line; determining ambient specific humidity; calculating specific humidity in a portion of the intake line comprised between said connecting point and said intake manifold, as a function of a flow of external air entering into said intake line, a flow of exhaust gases coming from said Low Pressure EGR (LPE) conduit, the specific humidity in said exhaust line and the ambient specific humidity; calculating the relative humidity in said portion of the intake line, as a function of the specific humidity thereof.

25 Claims, 3 Drawing Sheets

(56) References Cited

U.S. PATENT DOCUMENTS

| | | |
|---|---|---|
| 6,948,475 B1 | 9/2005 | Wong et al. |
| 7,079,938 B2 | 7/2006 | Bhargava et al. |
| 2003/0089165 A1* | 5/2003 | Yamazaki et al. ............ 73/118.1 |
| 2003/0136390 A1* | 7/2003 | Ramamurthy et al. .. 123/568.22 |
| 2003/0192516 A1 | 10/2003 | Brunemann et al. |
| 2007/0239344 A1 | 10/2007 | Durand |
| 2008/0059049 A1 | 3/2008 | Totten et al. |
| 2009/0157230 A1 | 6/2009 | Hibshman, II et al. |
| 2010/0236532 A1* | 9/2010 | Xiao et al. ..................... 123/677 |
| 2011/0023855 A1* | 2/2011 | Van Nieuwstadt et al. ... 123/703 |
| 2011/0047985 A1* | 3/2011 | Zawacki et al. ................. 60/286 |
| 2011/0132340 A1* | 6/2011 | Soltis ............................ 123/703 |

FOREIGN PATENT DOCUMENTS

| | | |
|---|---|---|
| DE | 10258402 A1 | 7/2003 |
| DE | 10251364 A1 | 12/2003 |
| DE | 102008055521 A1 | 6/2009 |

* cited by examiner

METHOD FOR MANAGING THE RELATIVE HUMIDITY IN THE AIR PATH OF AN INTERNAL COMBUSTION ENGINE EQUIPPED WITH A LOW PRESSURE EGR SYSTEM

CROSS-REFERENCE TO RELATED APPLICATION

This application claims priority to British Patent Application No. 1006690.0, filed Apr. 21, 2010, which is incorporated herein by reference in its entirety.

TECHNICAL FIELD

The technical field relates to a method for managing the relative humidity in the air path of an internal combustion engine system equipped with a low pressure EGR system.

BACKGROUND

A turbocharged Diesel engine system generally comprises a Diesel engine having an intake manifold and an exhaust manifold, an external air conduit for conveying fresh air from the environment into an intake line leading to an intake manifold, an exhaust line for conveying the exhaust gas from an exhaust manifold to the environment, and a turbocharger which comprises a compressor located in the intake line for compressing the air stream flowing therein, and a turbine located in the exhaust line for driving said compressor. The turbocharged Diesel engine system further comprises an intercooler, also called a charge air cooler, located in the intake line downstream the compressor, for cooling the air stream before it reaches the intake manifold, and a Diesel Oxidation Catalyst (DOC) located in the exhaust line downstream the turbine, for degrading residual hydrocarbons and carbon oxides contained in the exhaust gas. The turbocharged Diesel engine systems can also be equipped with a Diesel Particulate Filter (DPF) located in the exhaust line downstream the DOC, for capturing and removing diesel particulate matter (soot) from the exhaust gas.

In order to reduce the polluting emission, most turbocharged Diesel engine system actually comprises an exhaust gas recirculation (EGR) system, for selectively routing back exhaust gas from the exhaust manifold into the intake manifold. The exhaust gas mixed with the fresh induction air is aspired into the engine cylinders, in order to reduce the production of oxides of nitrogen (NOx) during the combustion process.

Conventional EGR systems comprise an high pressure EGR conduit for fluidly connecting the exhaust manifold with the intake manifold, an EGR cooler for cooling the exhaust gas before mixing it with the induction air, valve means for regulating the flow rate of exhaust gas through the EGR conduit, and a Electronic Control Unit (ECU) based on a microprocessor for determining the required amount of exhaust gas and for controlling said valve means accordingly. In order to further reduce the NOx emission, improved EGR systems comprise also an additional Low Pressure EGR (LPE) conduit, which fluidly connects the exhaust line downstream the DPF with the intake line upstream the compressor, an additional EGR cooler located in the additional EGR conduit, and additional valve means for regulating the flow rate of exhaust gas through the additional EGR conduit. In these improved systems, while the conventional EGR conduit defines a short route for the exhaust gas recirculation, the additional EGR conduit defines a long route for the exhaust gas recirculation, which comprises also a relevant portion of the exhaust line and a relevant portion of the intake line.

While low pressure EGR conduit systems have several benefits, as explained above, they also raise the complexity of the engine structure and give rise to a certain number of technical problems. Since these low pressure EGR conduits re-circulate exhaust gas with vapor content due to fuel combustion this causes the problem that, under certain engine operating, conditions the air path components in the portion comprising the compressor and the charge air cooler can experience a high value of relative humidity that may even lead to water condensation in the form of water droplets and therefore damage and corrosion of these components.

At least a first aim is therefore to protect the mentioned air path from damage due to an undesired high value of relative air humidity. At least a further aim is to avoid the risk of water condensation in said air path of the engine. At least another aim is to provide such protection strategy without using complex devices and taking advantage from the computational capabilities of the Electronic Control Unit (ECU) of the vehicle. In addition, other aims, desirable features and characteristics will become apparent from the subsequent summary and detailed description, and the appended claims, taken in conjunction with the accompanying drawings and this background.

SUMMARY

An embodiment of the disclosure provides for a Method for estimating the relative humidity in an intake line of an internal combustion engine provided with an intake manifold connected to the intake line, an exhaust line, and a Low Pressure EGR (LPE) conduit which fluidly connects the exhaust line to a connecting point of said intake line, said method comprising calculating specific humidity in the exhaust line, as a function of the $O_2$ concentration in said exhaust line; determining ambient specific humidity; calculating specific humidity in a portion of the intake line comprised between said connecting point and said intake manifold, as a function of a flow of external air entering into said intake line, a flow of exhaust gases coming from said Low Pressure EGR (LPE) conduit, the specific humidity in said exhaust line and the ambient specific humidity; calculating the relative humidity in said portion of the intake line, as a function of the specific humidity thereof. This embodiment of the method provides for the advantage of a reliable estimate of the relative humidity in the air path in various operating conditions of the engine without using a dedicated sensor.

According to an embodiment of the method, the $O_2$ concentration in said exhaust line is measured by means of a lambda sensor. This embodiment takes advantage from the measure of a sensor which is generally present in current internal combustion engines avoiding unnecessary costs.

According to a further embodiment of the method, the specific humidity and the relative humidity in said portion of the intake line are calculated upstream of a compressor. This embodiment of the method provides for the advantage of an estimate of the relative humidity useful to protect the compressor and the components downstream to it.

According to another embodiment of the method the specific humidity and the relative humidity in said portion of the intake line are calculated downstream of a charge air cooler. This embodiment of the method provides for the advantage of an estimate of the relative humidity useful to protect the components downstream of the charge air cooler.

According to still another embodiment of the method the estimation of the relative humidity in said portion of the intake line is performed on the basis of a map correlating ambient humidity to ambient temperature. This embodiment has the advantage of measuring in real time the relative humidity of the air entering into the engine system without the need of a humidity sensor, improving on cost savings.

According to a further embodiment it is provided for a method for regulating relative humidity in an intake line of an internal combustion engine provided with an intake manifold connected to the intake line, an exhaust line, and a Low Pressure EGR (LPE) conduit which fluidly connects the exhaust line to a connecting point of said intake line, said method comprising: estimating the relative humidity in a portion of said intake line comprised between said connecting point and said intake manifold, according to any of the preceding claims, comparing said relative humidity with a first threshold of said relative humidity and, in case said relative humidity is above said first threshold, adjusting the exhaust gas flow into said portion such as to reduce the relative humidity therein. The advantage of this embodiment is that it allows too keep the relative humidity in the intake manifold safely below the saturation point avoiding water condensation and the ensuing corrosion.

According to a further embodiment it is provided for a method for regulating relative humidity in an intake line of an internal combustion engine in which a second threshold (Hprotection) of said relative humidity is defined, said second threshold (Hprotection) being lower than said first threshold, and in which the exhaust gas flow into said portion is adjusted such as to reduce the relative humidity therein below said second threshold (Hprotection). The advantage of this embodiment is that it allows a heightened level of protection of the intake line.

According to a further embodiment it is provided for a method for regulating relative humidity in an intake line of an internal combustion engine in which said step of adjusting the gas flow into said portion of the intake line comprises a step of regulating the ratio of exhaust gas flow circulating in a High Pressure EGR (HPE) conduit with respect to the exhaust gas flow circulating in the Low Pressure EGR (LPE) conduit. The advantage of this embodiment is that it allows too keep the relative humidity in the intake manifold in a safe region using valves and conduits already generally present in an engine system.

The method according to one of its aspects can be carried out with the help of a computer program comprising a program-code for carrying out all the steps of the method described above, and in the form of computer program product comprising the computer program. The computer program product can be embodied as a control apparatus for an internal combustion engine, comprising an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

More in detail, the embodiments of the method described above may be carried out with the help of a computer program comprising a program code or computer readable instructions for carrying out all the method steps described above. The computer program can be stored on a data carrier or, in general, a computer readable medium or storage unit, to represent a computer program product. The storage unit may be a CD, DVD, a hard disk, a flash memory or the like.

The computer program can be also embodied as an electromagnetic signal, the signal being modulated to carry a sequence of data bits which represent a computer program to carry out all steps of the method. The computer program may reside on or in a data carrier, e.g. a flash memory, which is data connected with a control apparatus for an internal combustion engine. The control apparatus has a microprocessor which receives computer readable instructions in form of parts of said computer program and executes them. Executing these instructions amounts to performing the steps of the method as described above, either wholly or in part.

The electronic control unit or, in general, an ECA (Electronic Control Apparatus) can be a dedicated piece of hardware such as an ECU (Electronic Control Unit) or a transmission control unit, which are commercially available and thus known in the art, or can be an apparatus different from such an ECU, e.g. an embedded controller. If the computer program is embodied as an electromagnetic signal as described above, then the electronic control apparatus, e.g., the ECU or TCM, has a receiver for receiving such a signal or is connected to such a receiver placed elsewhere. The signal may be transmitted by a programming robot in a manufacturing plant. The bit sequence carried by the signal is then extracted by a demodulator connected to the storage unit, after which the bit sequence is stored on or in said storage unit of the ECU or TCM.

The method according to a further aspect can be also embodied as an electromagnetic signal, said signal being modulated to carry a sequence of data bits which represents a computer program to carry out all steps of the method. A still further embodiment of the disclosure provides an internal combustion engine specially arranged for carrying out the method claimed.

Another embodiment relates to an apparatus for estimating the relative humidity in an intake line of an internal combustion engine provided with an intake manifold connected to the intake line, an exhaust line, and a Low Pressure EGR (LPE) conduit which fluidly connects the exhaust line to a connecting point of said intake line, said apparatus comprising means for calculating specific humidity in the exhaust line, as a function of the $O_2$ concentration in said exhaust line; means for determining ambient specific humidity; means for calculating specific humidity in a portion of the intake line comprised between said connecting point and said intake manifold, as a function of a flow of external air entering into said intake line, a flow of exhaust gases coming from said Low Pressure EGR (LPE) conduit, the specific humidity in said exhaust line and the ambient specific humidity and means for calculating the relative humidity in said portion of the intake line as a function of the specific humidity thereof. This apparatus provides the advantage of a reliable estimate of the relative humidity in the air path in various operating conditions of the engine without using a dedicated sensor.

An embodiment of the apparatus is configured to measure the $O_2$ concentration in said exhaust line by means of a lambda sensor. This embodiment takes advantage from the measure of a sensor which is generally present in current internal combustion engines avoiding unnecessary costs.

Another embodiment is embodied to calculate the specific humidity and the relative humidity in said portion of the intake line are calculated upstream of a compressor. This embodiment provides the advantage of an estimate of the relative humidity useful to protect the compressor and the components downstream to it.

It is furthermore possible to select an apparatus which calculates the specific humidity and the relative humidity in said portion of the intake line downstream of a charge air cooler. This embodiment of provides the advantage of an estimate of the relative humidity useful to protect the components downstream of the charge air cooler.

Still another embodiment performs the estimation of the relative humidity in said portion of the intake line is performed on the basis of a map correlating ambient humidity to ambient temperature. This embodiment has the advantage of measuring in real time the relative humidity of the air entering into the engine system without the need of a humidity sensor, improving on cost savings.

BRIEF DESCRIPTION OF THE DRAWINGS

The present invention will hereinafter be described in conjunction with the following drawing figures, wherein like numerals denote like elements, and.

DETAILED DESCRIPTION OF THE DRAWINGS

The following detailed description of the invention is merely exemplary in nature and is not intended to limit application and uses. Furthermore, there is no intention to be bound by any theory presented in the preceding background or summary or the following detailed description of the invention. Preferred embodiments of the method will now be described with reference to the enclosed drawings and with reference to a turbocharged Diesel engine system. However, the concepts described herein may be applied to different Diesel engine system and even to spark-ignition engine systems.

Figure 1:
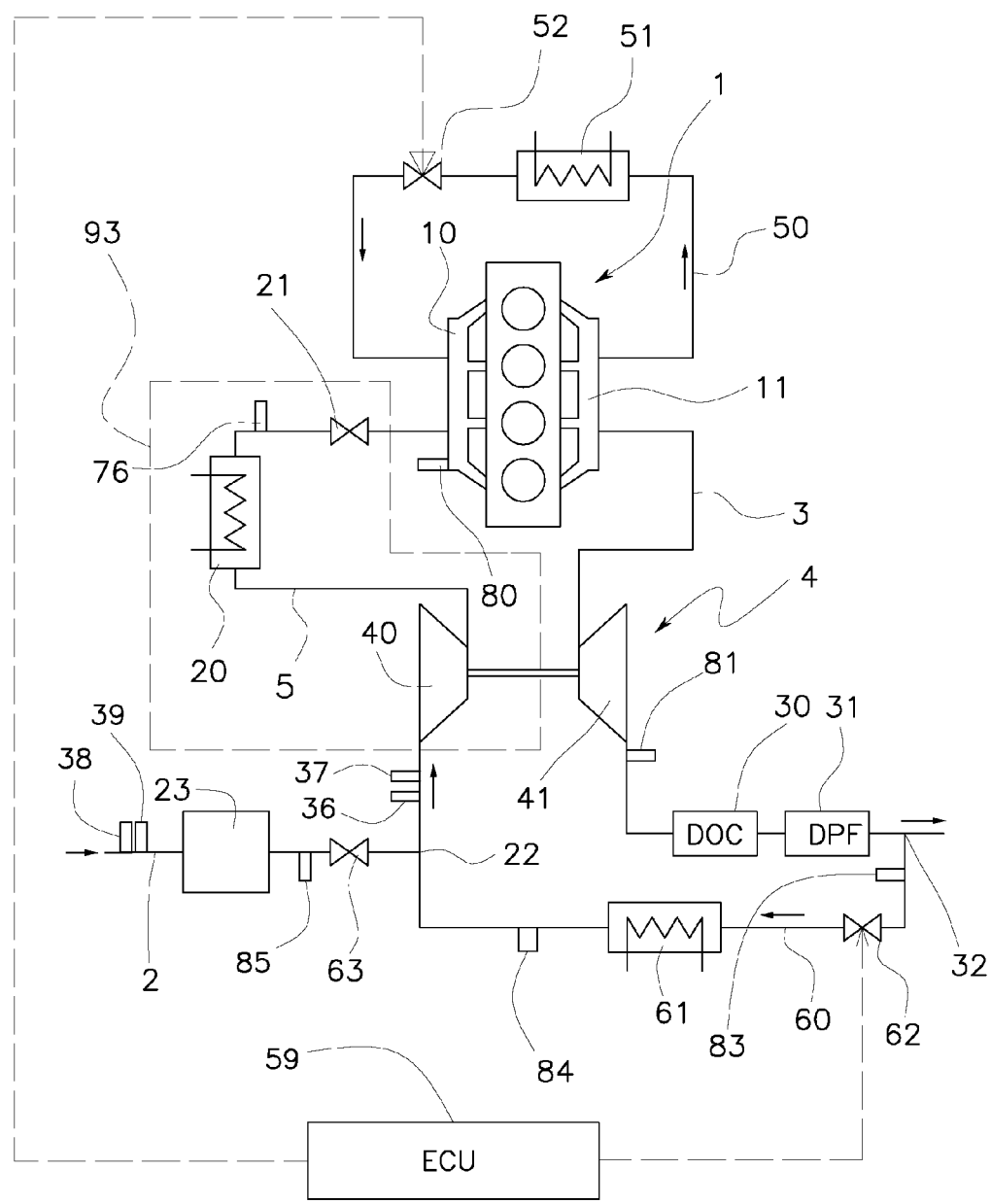
FIG. 1 is a schematic illustration of a turbocharged Diesel engine system allowing the method according to the present description and its various embodiments.

More specifically, the method is described also with exemplary reference to the engine system depicted in FIG. 1, and comprises the use of an algorithm that estimates the relative humidity at the charge air cooler outlet and at the turbocharger inlet and limits the Low Pressure EGR (LPE) rate to not exceed a humidity threshold. The humidity estimation starts from the water vapor content inside the exhaust gases that is calculated starting from a lambda (λ) measurement from a lambda sensor 81 in an exhaust line 3 of the engine 1, namely a measurement of the $O_2$ concentration in the exhaust gas. Then, by doing a mass balance of the water flows that are coming from the exhaust gases recirculated from the Low Pressure EGR (LPE) loop and from the ambient, it is possible to estimate the relative humidity at the charge air cooler 20 outlet and at the turbocharger 40 inlet, considering also the temperature at the charge air cooler 20 outlet, measured by a temperature sensor 76 and the temperature at the turbocharger inlet which is preferably estimated.

The turbocharged Diesel engine system of FIG. 1 comprises a Diesel engine 1 having an intake manifold 10 and an exhaust manifold 11, an external air conduit 2 for conveying fresh air from the environment into an intake line 5 leading to an engine intake manifold 10, an exhaust line 3 for conveying the exhaust gas from the exhaust manifold 11 to the environment, and a turbocharger 4 which comprises a compressor 40 located in the intake line 5 for compressing the air stream flowing therein, and a turbine 41 located in the exhaust line 3 for driving said compressor 40. A temperature sensor 80 is provided for determining the temperature within the intake manifold 10.

The turbocharged Diesel engine system further comprises an intercooler (or charge air cooler) 20 located in the intake line 5 downstream the compressor 40 of the turbocharger 4, for cooling the air stream before it reaches the intake manifold 10, and a valve 21 located in the intake line between the intercooler 20 and the intake manifold 10. The turbocharged Diesel engine system further comprises a Diesel Oxidation Catalyst (DOC) 30 located in the exhaust line 3 downstream the turbine 41 of turbocharger 4, for degrading residual hydrocarbons and carbon oxides contained in the exhaust gas, and a diesel particulate filter (DPF) 31 located in the exhaust line 3 downstream the DOC 30, for capturing and removing diesel particulate matter (soot) from the exhaust gas.

In order to reduce the pollutant emission, the turbocharged Diesel engine system comprises an Exhaust Gas Recirculation (EGR) system, for selectively routing back exhaust gas from the exhaust manifold into the intake manifold. The EGR system comprises a first EGR conduit 50 (also indicated as High Pressure EGR (HPE) conduit) for directly fluidly connecting the exhaust manifold 11 with the intake manifold 12, a first EGR cooler 51 for cooling the exhaust gas, and a first electrically controlled valve 52 for determining the flow rate of exhaust gas through the first EGR conduit 51. The first EGR conduit 51 defines a short route for the exhaust gas recirculation cooler, so that the exhaust gas routed back by this EGR conduit 51 is quite hot.

The EGR system further comprise a second Low Pressure EGR (LPE) conduit 60, which fluidly connects a branching point 32 of the exhaust line 3 downstream the DPF 31 with a connecting point 22 to the intake line 5 upstream the compressor 40 of turbocharger 4, and a second EGR cooler 61 located in the additional EGR conduit 60.

The flow rate of exhaust gas through the second EGR conduit 60 is determined by an electrically controlled valve 62, wherein the valve 62 is located in the second EGR conduit 60 upstream the second EGR cooler 61. A valve 63 is located in the external air conduit 2 downstream an air filter 23 and upstream the connecting point 22.

The second EGR conduit 60 defines a long route for the exhaust gas recirculation, which comprises also the portion of the exhaust line 3 comprised between the exhaust manifold 11 and the branching point 32, and the portion 93 of the intake line 5 comprised between the connecting point 22 and the intake manifold 10.

Flowing along the long route, the exhaust gas is obliged to pass through the turbine 41 of turbocharger 4, the DOC 30, the DPF 31, the second EGR cooler 61, the compressor 40 of turbocharger 4 and the intercooler 20, so that it become considerably colder than the exhaust gas which flows through the first EGR conduit 50, to thereby reaching the intake manifold at a lower temperature.

The turbocharged Diesel engine system is operated by a Electronic Control Unit (ECU) 59 which is provided for generating and applying control signals to the valves 52, 62 and 63, to thereby adjusting the flow rate of exhaust has through the first EGR conduit 50 and the second EGR conduit 60. Furthermore, in the exhaust line 3 a lambda sensor 81 is provided, whereby such sensor is used to determine the air to fuel ratio λ in the exhaust line 3.

Also pressure 83 and temperature 84 sensors may be provided in the exhaust line and further sensors, such as a Mass Air Flow (MAF) sensor 85, will be described in the context in which they appear in performing the present method and its various embodiments.

The method described can be divided in two parts: charge air cooler outlet and turbocharger inlet relative humidity estimation model; and a recovery action. Concerning the recovery action, its goal is to avoid water condensation at the turbocharger inlet or at the charge air cooler outlet. A preferred recovery action to obtain that goal is regulate the ratio of exhaust gas circulating in a High Pressure EGR (HPE) conduit with respect to the exhaust gas circulating in a Low Pressure EGR (LPE) conduit, namely the split between High Pressure EGR (HPE) and Low Pressure EGR (LPE). Concerning the charge air cooler outlet and turbocharger inlet relative humidity estimation model we note that it can be divided in four subsystems: Exhaust water vapour model 110; Ambient specific humidity calculation 120; Turbocharger inlet and charge air cooler outlet specific humidity calculation 130; and Turbocharger inlet and charge air cooler outlet relative humidity calculation 140.

Concerning the first subsystem, namely the exhaust water vapour model 110, it must be considered that the goal of this subsystem is to calculate the exhaust water vapor content that is a product of the combustion. The calculation starts from the combustion law (under the hypothesis of perfect combustion) that, for a lean mixture, can be written in the following way:

$$x \cdot CO_2 + \frac{y}{2} \cdot H_2O + (\lambda - 1) \cdot \left(x + \frac{y}{4}\right) \cdot O_2 + 3.713 \cdot \lambda \cdot \left(x + \frac{y}{4}\right) \cdot N_2$$

Where:

$$\frac{y}{x} \approx 1.8;$$

and $\lambda$, is the air to fuel ratio determined using a lambda sensor 81 generally present in the engine system.

From the above equation it is possible to calculate the water concentration [$H_2O$] in the following way:

$$[H_2O] = \frac{n_{mol,H_2O}}{n_{mol,exh}} = \frac{y/2}{x + y/2 + (\lambda - 1) \cdot (x + y/4) + 3.713 \cdot \lambda \cdot (x + y/4)}$$

and then the exhaust specific humidity considering the exhaust molecular weight and the water molecular weight:

$$x_{exh} = [H_2O] \cdot \frac{M_{H_2O}}{M_{exh}}$$

Where:

$M_{H_2O}$ is the water molecular weight (18 g/mol); and $M_{exh}$ is the exhaust molecular weight (29 g/mol).

Figure 2:
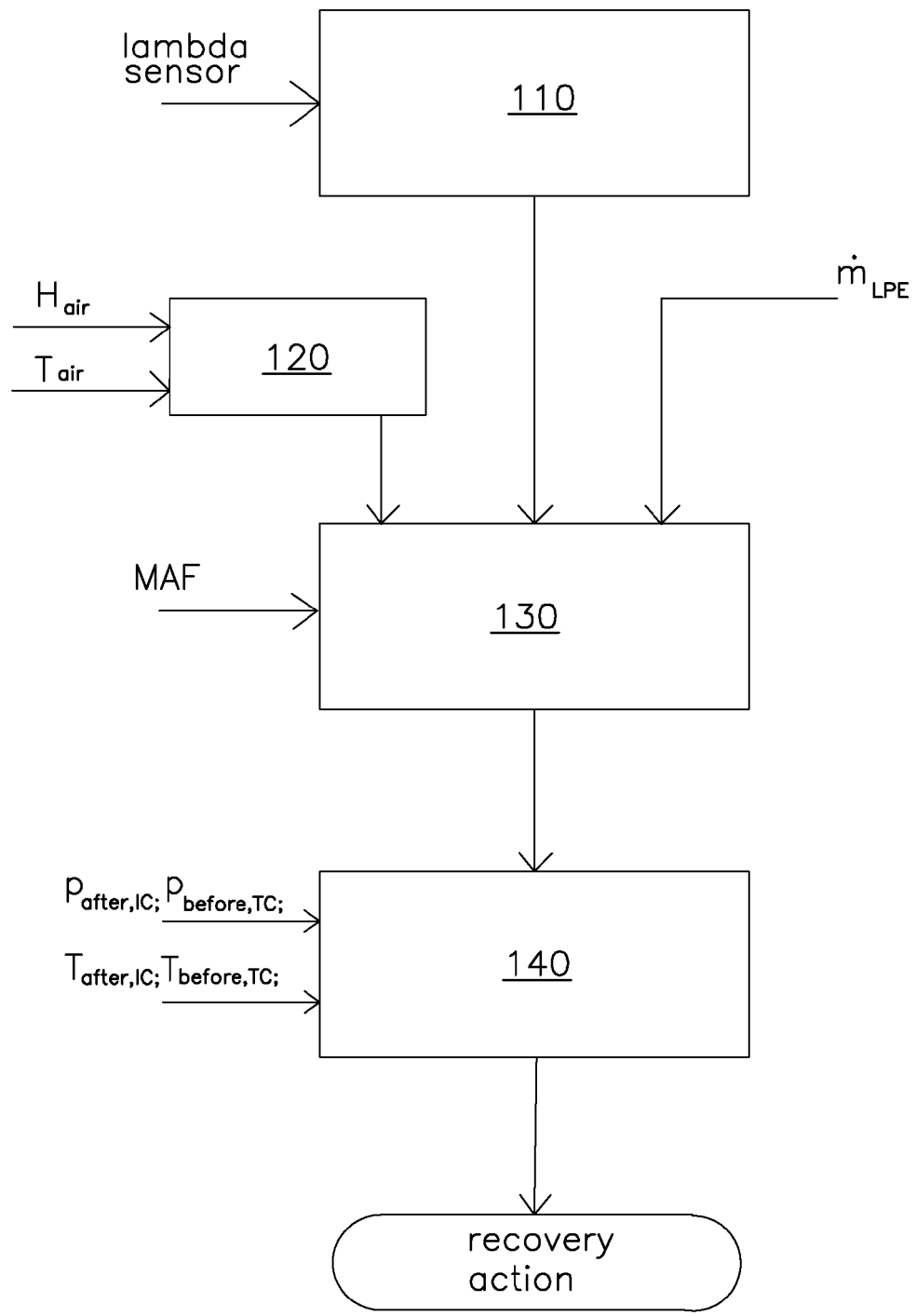
FIG. 2 is a schematic representation of the main blocks of the estimation model.

The ambient specific humidity ($x_{air}$) estimation (block 120 in FIG. 2) is then performed based on the ambient conditions (temperature ($T_{air}$) and relative humidity ($H_{air}$)):

$$x_{air} = 0.622 \cdot \frac{H_{air} \cdot p_{sat,air}}{p_{air} - H_{air} \cdot p_{sat,air}}$$

Where:

$H_{air}$ is ambient relative humidity (%) that can be measured by a dedicated sensor (indicated with the reference numeral 38 in FIG. 1) or estimated;

$p_{air}$ is the ambient pressure (mbar); and $p_{sat,air}$ is the saturation pressure of the water vapour present in the fresh air and can be calculated as follows:

$$p_{sat,air} = 610.5 \cdot e^{\frac{17.269 \cdot T_{air}}{237.3 + T_{air}}}$$

Where $T_{air}$ is ambient temperature (° C.) measured by a sensor (indicated with the reference numeral 39 in FIG. 1).

In case an ambient humidity sensor is not present, the humidity measurement can be replaced by a map of ambient humidity as a function of the ambient temperature; for example a map calibrated as a function of the historical series data for continental climate. In an alternative embodiment, temperature and humidity data can be stored in a table and read there from. An example of such data is given in the following table 1:

TABLE 1

| BASELINE | |
|---|---|
| T [° C.] | RH [%] |
| 13 | 100 |
| 15 | 100 |
| 17 | 100 |
| 19 | 100 |
| 21 | 100 |
| 23 | 100 |
| 25 | 95 |
| 27 | 85 |
| 29 | 75 |
| 31 | 65 |
| 33 | 65 |

As a third alternative, $H_{air}$ can be set at 100% for all ambient temperatures. This alternative is the simplest and most conservative one.

Concerning the turbocharger inlet and charge air cooler outlet specific humidity calculation (block 130), it is to be noted that this model provides an estimation of the specific humidity at the compressor inlet ($x_{before,TC}$) and at the charge air cooler outlet ($x_{after,IC}$). This estimation is done taking into account the mixing between the fresh air and the exhaust gases (recirculated from the low pressure EGR loop) and their corresponding water contents (calculated in the two previous blocks).

$$x_{before,TC} = \frac{\dot{m}_{air} \cdot x_{air} + \dot{m}_{LPE} \cdot x_{exh}}{\dot{m}_{air} + \dot{m}_{LPE}}$$

Where:

$\dot{m}_{air}$ is the mass air flow measured by the MAF sensor 85, already present in the vehicle;

$x_{air}$ is the ambient specific humidity;

$\dot{m}_{LPE}$ is the low pressure EGR flow; and $x_{exh}$ is the exhaust specific humidity.

According to the mass conservation law, the specific humidity at the charge air cooler outlet is the same as at the compressor inlet:

$$x_{before,TC} = x_{after,IC}.$$

Once that the specific humidity at the compressor inlet and at the charge air cooler outlet are known, it is possible to calculate the corresponding relative humidity (block 140) based on the thermodynamic conditions (pressure and temperature).

According to the equation already used for the calculation of relative humidity of ambient air, the relative humidity at the compressor inlet can be calculated as follows:

$$H_{before,TC} = \frac{x_{before,TC} \cdot p_{before,TC}}{(x_{before,TC} + 0.622) \cdot p_{sat,before,TC}}$$

Where:
$x_{before,TC}$ is the specific humidity at the turbocharger inlet;
$p_{before,TC}$ is the absolute pressure at the turbocharger inlet that can be estimated or measured by a sensor;
$p_{sat,before,TC}$ is the saturation pressure of the water vapour present at the compressor inlet and can be calculated as follows:

$$P_{sat,before,TC} = 610.5 \cdot e^{\frac{17.269 \cdot T_{before,TC}}{237.3 + T_{before,TC}}}$$

Where $T_{before,TC}$ is temperature at the turbocharger inlet that can be estimated or measured by a sensor.

In the same way it is possible to calculate the relative humidity at the charge air cooler outlet:

$$H_{after,IC} = \frac{x_{after,IC} \cdot p_{after,IC}}{(x_{after,IC} + 0.622) \cdot p_{sat,after,IC}}$$

Where:
$x_{after,IC}$ is the specific humidity at the charge air cooler outlet;
$p_{after,IC}$ is the absolute pressure at the charge air cooler outlet that is assumed equal to the manifold pressure (that is measured by a sensor); and
$p_{sat,after,IC}$ is the saturation pressure of the water vapour present at the charge air cooler outlet and can be calculated as follows:

$$p_{sat,after,IC} = 610.5 \cdot e^{\frac{17.269 \cdot T_{after,IC}}{237.3 + T_{after,IC}}}$$

Where $T_{after,IC}$ is temperature at the charge air cooler outlet that can be estimated or measured by a sensor.

Figure 3:
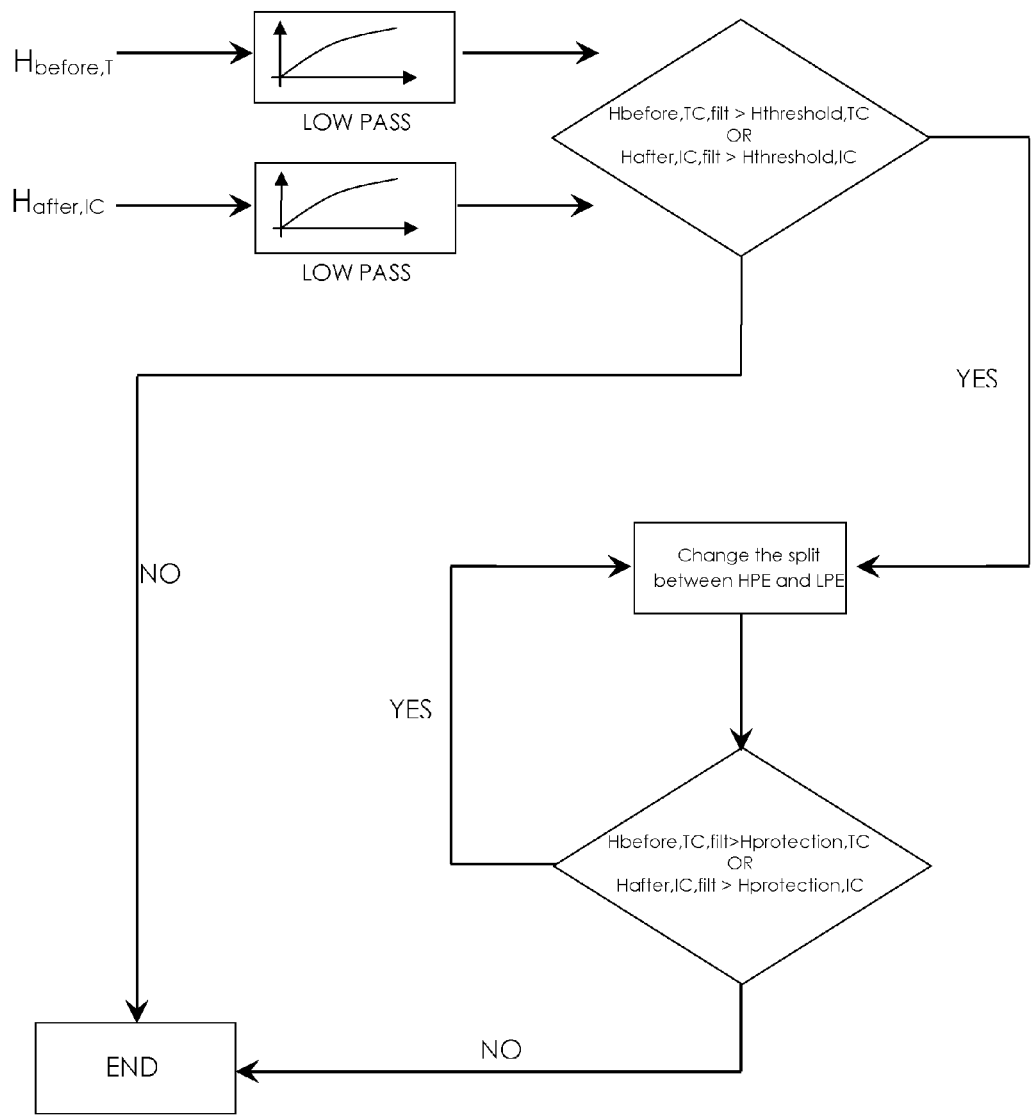
FIG. 3 is a flowchart of the actions performed in an embodiment of the method.

The two estimated values of relative humidity will be then used in a recovery action to protect the engine from possible damages due to liquid water formation, as schematically indicated in the flowchart of FIG. 3. The goal of this recovery action is to keep the relative humidity at the turbocharger inlet or the humidity at the charge air cooler outlet at a safe value (Hprotection) to avoid possible water formation that can damage the compressor wheel or the air ducts. This goal may be reached, for example, by means of regulation of the ratio of exhaust gas flow circulating in the High Pressure EGR (HPE) conduit 50 with respect to the exhaust gas flow circulating in a Low Pressure EGR (LPE) conduit 60. The recovery action takes the output of the estimation block 140, (namely Hbefore,TC and Hafter,IC) and compares the filtered (with a low pass filter) values to two thresholds. If at least one of the filtered values is above its threshold, the protection is activated and, thus, the split between HPE and LPE is changed until the filtered value of humidity drops below a second threshold (Hprotection).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for estimating a relative humidity in an intake line of an internal combustion engine provided with an intake manifold connected to the intake line, an exhaust line, and a Low Pressure EGR (LPE) conduit that fluidly connects the exhaust line to a connecting point of the intake line, said method comprising:
calculating a first specific humidity in the exhaust line as a function of an $O_2$ concentration in said exhaust line;
determining an ambient specific humidity;
calculating a second specific humidity in a portion of the intake line comprised between said connecting point and said intake manifold as a function of a flow of external air entering into said intake line, a flow of exhaust gases coming from said Low Pressure EGR (LPE) conduit, the first specific humidity in the exhaust line and the ambient specific humidity; and
calculating the relative humidity in said portion of the intake line, as a function of the specific humidity.

2. The method according to claim 1, further comprising measuring the $O_2$ concentration in the exhaust line with a lambda sensor.

3. The method according to claim 1, further comprising calculating the specific humidity and the relative humidity in said portion of the intake line upstream of a compressor.

4. The method according to claim 1, further comprising calculation the specific humidity and the relative humidity in said portion of the intake line downstream of a charge air cooler.

5. The method according to claim 1, further comprising estimating the relative humidity in said portion of the intake line at least on a basis of a map correlating ambient humidity to ambient temperature.

6. The method according to claim 1, further comprising:
comparing said relative humidity with a first threshold of said relative humidity and in case said relative humidity is above said first threshold; and
adjusting an exhaust gas flow into said portion such as to reduce the relative humidity.

7. The method according to claim 6, further comprising:
defining a second threshold of said relative humidity, said second threshold lower than said first threshold; and
adjusting the exhaust gas flow into said portion to reduce the relative humidity therein below said second threshold.

8. The method according to claim 6, wherein said adjusting a gas flow into said portion of the intake line comprises regulating a ratio of exhaust gas flow circulating in a High Pressure EGR (HPE) conduit with respect to the exhaust gas flow circulating in the Low Pressure EGR (LPE) conduit.

9. An internal combustion engine comprising
an intake line;
an intake manifold connected to the intake line;
an exhaust line;

a Low Pressure EGR (LPE) conduit that fluidly connects the exhaust line to a connecting point of the intake line; and an Electronic Control Unit (ECU) configured to:
  determine an ambient specific humidity;
  calculate specific humidity in a portion of the intake line comprised between said connecting point and said intake manifold as a function of a flow of external air entering into said intake line, a flow of exhaust gases coming from said Low Pressure EGR (LPE) conduit, the specific humidity in the exhaust line and the ambient specific humidity; and
  calculate a relative humidity in said portion of the intake line, as a function of the specific humidity.

10. The internal combustion engine according to claim 9, wherein the ECU is further configured to measure an $O_2$ concentration in the exhaust line with a lambda sensor.

11. The internal combustion engine according to claim 9, wherein the ECU is further configured to calculate the specific humidity and the relative humidity in said portion of the intake line upstream of a compressor.

12. The internal combustion engine according to claim 9, wherein the ECU is further configured to calculate the specific humidity and the relative humidity in said portion of the intake line downstream of a charge air cooler.

13. The internal combustion engine according to claim 9, wherein the ECU is further configured to estimate the relative humidity in said portion of the intake line at least on a basis of a map correlating ambient humidity to ambient temperature.

14. The internal combustion engine according to claim 9, wherein the ECU is further configured to:
  compare said relative humidity with a first threshold of said relative humidity and in case said relative humidity is above said first threshold; and
  adjust an exhaust gas flow into said portion such as to reduce the relative humidity.

15. The internal combustion engine according to claim 14, wherein the ECU is further configured to:
  define a second threshold of said relative humidity, said second threshold lower than said first threshold; and
  adjust the exhaust gas flow into said portion to reduce the relative humidity below said second threshold.

16. The internal combustion engine according to claim 14, wherein the ECU is further configured to regulating a ratio of exhaust gas flow circulating in a High Pressure EGR (HPE) conduit with respect to the exhaust gas flow circulating in the Low Pressure EGR (LPE) conduit.

17. An apparatus for estimating a relative humidity in an intake line of an internal combustion engine provided with an intake manifold connected to the intake line, an exhaust line, and a Low Pressure EGR (LPE) conduit that fluidly connects the exhaust line to a connecting point of said intake line, said apparatus comprising:
  means for calculating specific humidity in the exhaust line, as a function of an $O_2$ concentration in said exhaust line;
  means for determining an ambient specific humidity;
  means for calculating a second specific humidity in a portion of the intake line comprised between said connecting point and said intake manifold, as a function of a flow of external air entering into said intake line, a flow of exhaust gases coming from said Low Pressure EGR (LPE) conduit, the specific humidity in said exhaust line and the ambient specific humidity; and
  means for calculating the relative humidity in said portion of the intake line, as a function of the specific humidity thereof.

18. The apparatus according to claim 17, further comprising means for measuring the $O_2$ concentration in said exhaust line.

19. The apparatus according to claim 18, wherein the means for measuring is a lambda sensor.

20. The apparatus according to claim 17, wherein the specific humidity and the relative humidity in said portion of the intake line are calculated upstream of a compressor.

21. The apparatus according to claim 17, where the specific humidity and the relative humidity in said portion of the intake line are calculated downstream of a charge air cooler.

22. The apparatus according to claim 17, wherein the estimating of the relative humidity in said portion of the intake line is performed on a basis of a map correlating ambient humidity to ambient temperature.

23. The apparatus according to claim 17, further comprising:
  means for comparing said relative humidity with a first threshold of said relative humidity and, in case said relative humidity is above said first threshold; and
  means for adjusting an exhaust gas flow into said portion such as to reduce the relative humidity therein.

24. The Apparatus according to claim 23,
  wherein a second threshold of said relative humidity is defined that is lower than said first threshold, and
  wherein the exhaust gas flow into said portion is adjusted such as to reduce the relative humidity therein below said second threshold.

25. The apparatus according to claim 23, wherein adjusting a gas flow into said portion of the intake line comprises regulating a ratio of exhaust gas flow circulating in a High Pressure EGR (HPE) conduit with respect to the exhaust gas flow circulating in the Low Pressure EGR (LPE) conduit.

* * * * *